(12) United States Patent
Torii et al.

(10) Patent No.: US 10,543,871 B2
(45) Date of Patent: Jan. 28, 2020

(54) DRIVE ASSIST DEVICE AND DRIVE ASSIST METHOD

(71) Applicant: SUBARU CORPORATION, Tokyo (JP)

(72) Inventors: Takeshi Torii, Tokyo (JP); Noeru Sato, Tokyo (JP); Hiroyuki Morikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/033,898

(22) Filed: Jul. 12, 2018

(65) Prior Publication Data

US 2019/0100244 A1 Apr. 4, 2019

(30) Foreign Application Priority Data

Sep. 29, 2017 (JP) ................................. 2017-190856

(51) Int. Cl.
| | |
|---|---|
| *B62D 15/00* | (2006.01) |
| *B62D 15/02* | (2006.01) |
| *G02B 27/01* | (2006.01) |
| *B60K 35/00* | (2006.01) |

(52) U.S. Cl.
CPC ......... *B62D 15/029* (2013.01); *B62D 15/024* (2013.01); *B62D 15/0215* (2013.01); *G02B 27/0101* (2013.01); *B60K 35/00* (2013.01); *G02B 2027/0141* (2013.01)

(58) Field of Classification Search
CPC .............. B62D 15/029; B62D 15/0215; B62D 15/024; G02B 27/0101

USPC ......................................................... 340/438
See application file for complete search history.

(56) References Cited

U.S. PATENT DOCUMENTS

| | | | | | |
|---|---|---|---|---|---|
| 3,918,176 | A | * | 11/1975 | Abernethy, III | ......... A61B 5/16 180/272 |
| 6,163,968 | A | * | 12/2000 | Colarelli, III | .......... G01B 11/14 116/31 |
| 7,414,520 | B2 | * | 8/2008 | Mei.beta.ner | .......... B60K 37/06 116/36 |
| 8,843,268 | B2 | * | 9/2014 | Lathrop | ................. B60K 35/00 340/438 |

(Continued)

FOREIGN PATENT DOCUMENTS

| | | |
|---|---|---|
| JP | 2004-340930 A | 12/2004 |
| JP | 2006-298196 A | 11/2006 |

(Continued)

OTHER PUBLICATIONS

Japanese Notification of Reasons for Refusal issued in corresponding Japanese Patent Application No. 2017-190856, dated Jan. 29, 2019, with English translation.

*Primary Examiner* — Ojiako K Nwugo
(74) *Attorney, Agent, or Firm* — McDermott Will & Emery LLP

(57) ABSTRACT

A drive assist device includes a determiner and a display controller. The determiner determines a parameter related to a current driving state of a vehicle. The display controller controls display of a display object that moves in response to operation of a steering wheel, and controls a movement of the display object with respect to a movement of the steering wheel, in accordance with a magnitude of the parameter.

12 Claims, 9 Drawing Sheets

(56) References Cited

U.S. PATENT DOCUMENTS

| | | | | |
|---|---|---|---|---|
| 9,024,741 B2* | 5/2015 | Bennett | ............... | B60Q 5/005 340/425.5 |
| 2008/0061954 A1* | 3/2008 | Kulas | ............... | B60K 35/00 340/438 |
| 2008/0143505 A1* | 6/2008 | Maruyama | ............... | B60K 35/00 340/441 |
| 2008/0224840 A1* | 9/2008 | Kawachi | ............... | B60K 35/00 340/438 |
| 2011/0187518 A1* | 8/2011 | Strumolo | ............... | B62D 1/046 340/438 |
| 2012/0209474 A1* | 8/2012 | Morris | ............... | B62D 1/046 701/42 |
| 2013/0002414 A1* | 1/2013 | Konet | ............... | B60K 37/06 340/436 |
| 2013/0076499 A1* | 3/2013 | Okita | ............... | B60K 35/00 340/438 |
| 2014/0111324 A1* | 4/2014 | Lisseman | ............... | B62D 1/046 340/435 |
| 2014/0111325 A1* | 4/2014 | Lisseman | ............... | B60Q 9/00 340/435 |
| 2014/0159887 A1* | 6/2014 | Piasecki | ............... | B60Q 1/00 340/438 |
| 2014/0244115 A1 | 8/2014 | Sanma et al. | | |
| 2017/0043807 A1* | 2/2017 | Shepard | ............... | B60D 1/245 |
| 2017/0151906 A1* | 6/2017 | Sakuma | ............... | B62D 1/046 |
| 2017/0274931 A1* | 9/2017 | Yang | ............... | B62D 15/021 |
| 2018/0025634 A1* | 1/2018 | Ujiie | ............... | G08G 1/0125 701/119 |
| 2018/0037261 A1* | 2/2018 | Shepard | ............... | B60D 1/06 |

FOREIGN PATENT DOCUMENTS

| | | |
|---|---|---|
| JP | 2007-204005 | 8/2007 |
| JP | 2014-164466 A | 9/2014 |
| WO | 2015/145674 A1 | 10/2015 |

* cited by examiner

DRIVE ASSIST DEVICE AND DRIVE ASSIST METHOD

CROSS-REFERENCE TO RELATED APPLICATIONS

The present application claims priority from Japanese Patent Application No. 2017-190856 filed on Sep. 29, 2017, the entire contents of which are hereby incorporated by reference.

BACKGROUND

1. Technical Field

The present invention relates to a drive assist device and a drive assist method.

2. Related Art

Japanese Unexamined Patent Application Publication (JP-A) No. 2006-298196 describes moving, on the basis of a necessary amount of steering that is calculated and a current amount of steering of a steering wheel 1 that is detected, a visual pattern P2 that moves independently of operation of the steering wheel with respect to a visual pattern P1 that moves in conjunction with operation of the steering wheel of a vehicle.

SUMMARY OF THE INVENTION

An aspect of the present invention provides a drive assist device including: a determiner configured to determine a parameter related to a current driving state of a vehicle; and a display controller configured to control display of a display object that moves in response to operation of a steering wheel, and control a movement of the display object with respect to a movement of the steering wheel, in accordance with a magnitude of the parameter.

An aspect of the present invention provides a drive assist method including: determining a parameter related to a current driving state of a vehicle; and controlling display of a display object that moves in response to operation of a steering wheel, and controlling a movement of the display object with respect to a movement of the steering wheel, in accordance with a magnitude of the parameter.

An aspect of the present invention provides a drive assist device including circuitry configured to determine a parameter related to a current driving state of a vehicle, and control display of a display object that moves in response to operation of a steering wheel, and control a movement of the display object with respect to a movement of the steering wheel, in accordance with a magnitude of the parameter.

DETAILED DESCRIPTION

Figure 1:
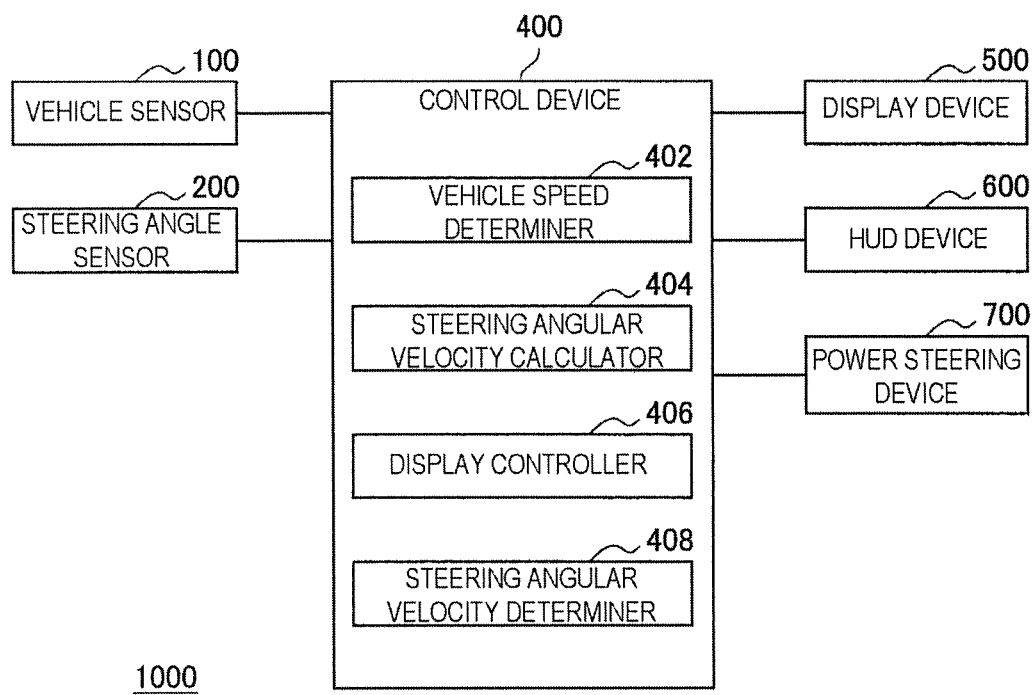
FIG. 1 is a schematic diagram illustrating a configuration of a drive assist system according to examples of the present invention.

Hereinafter, preferred examples of the present invention will be described in detail with reference to the appended drawings. Note that the following description is directed to illustrative examples of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted.

The technology described in JP-A No. 2006-298196 calculates a necessary amount of steering required for the vehicle to travel on the middle of a lane, from a current lateral displacement of the vehicle with respect to the middle of the lane on which the vehicle travels, and moves a visual pattern on the basis of a value obtained by subtracting a current amount of steering from the necessary amount of steering. However, such a technique can give a driver a visual illusion so that the vehicle travels on the middle of the lane, but it is difficult to give the driver an optimal steering feeling corresponding to a driving state of the vehicle.

It is desirable to provide a novel and improved drive assist device and drive assist method that are capable of giving a driver an optimal steering feeling corresponding to a driving state of a vehicle.

1. First Example

FIG. 1 is a schematic diagram illustrating a configuration of a drive assist system 1000 according to examples of the present invention. The drive assist system 1000 is a system basically configured in a vehicle, such as an automobile. As illustrated in FIG. 1, the drive assist system 1000 includes a vehicle sensor 100, a steering angle sensor 200, a control device 400, a display device 500, a HUD device 600, and a power steering device 700.

The vehicle sensor 100 includes various sensors that detect vehicle information, such as a speed of the vehicle, an acceleration of the vehicle, and an angular velocity of an axle (e.g., a drive shaft). Note that such vehicle information is generally communicated via a controller area network (CAN) in the vehicle; hence, the vehicle sensor 100 may acquire the vehicle information from the CAN. The steering angle sensor 200 detects an amount of operation (steering angle) of a steering wheel by a driver. The control device 400 is a structural element that controls the entire drive assist system 1000, and functions as a drive assist device according to the present example.

The display device 500 displays a pattern on the steering wheel. For instance, the display device 500 includes a projector, and projects a pattern on the steering wheel. Alternatively, the display device 500 may include a liquid crystal display device (LCD) or the like and be provided on the steering wheel.

The head-up display (HUD) device 600 is a display device that displays information directly in a human visual field, and displays a real image on glass, such as a front windshield or a rear windshield of an automobile. The power steering device 700 generates driving force in accordance with steering of the steering wheel by the driver, and steers front wheels of the vehicle.

Figure 2:
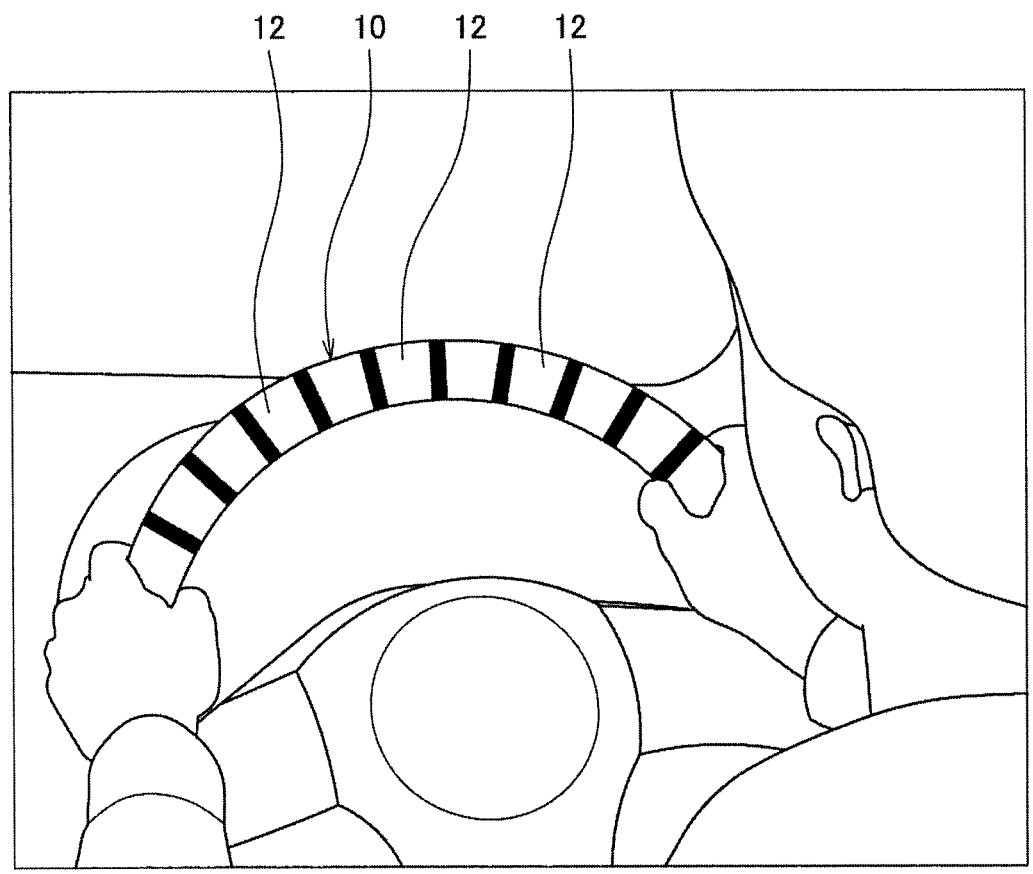
FIG. 2 is a schematic diagram illustrating a state in which a display device displays a pattern on a steering wheel.
Figure 3:
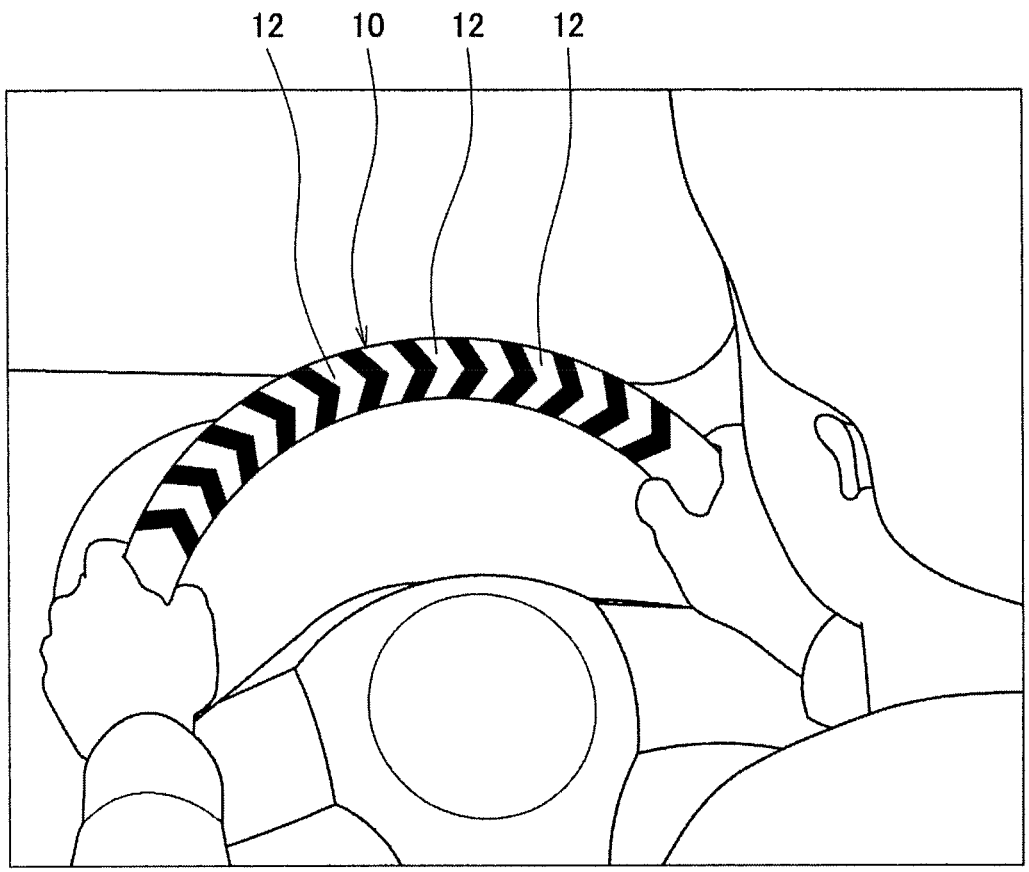
FIG. 3 is a schematic diagram illustrating a state in which a display device displays a pattern on a steering wheel.

FIGS. 2 and 3 are schematic diagrams each illustrating a state in which the display device 500 displays a pattern (display object) 12 on a steering wheel 10. Here, FIG. 2 illustrates an example in which the pattern 12 of stripes (strips) is displayed along a circumference of the steering wheel 10. In addition, FIG. 3 illustrates an example in which the pattern 12 of arrow shapes is displayed along a circumference of the steering wheel 10. For instance, FIGS. 2 and 3 illustrate states in which the white pattern 12 is displayed on the black steering wheel 10. Colors of the steering wheel 10 and the pattern 12 can be selected freely (e.g., the black pattern 12 may be displayed on the white steering wheel 10).

Figure 4:
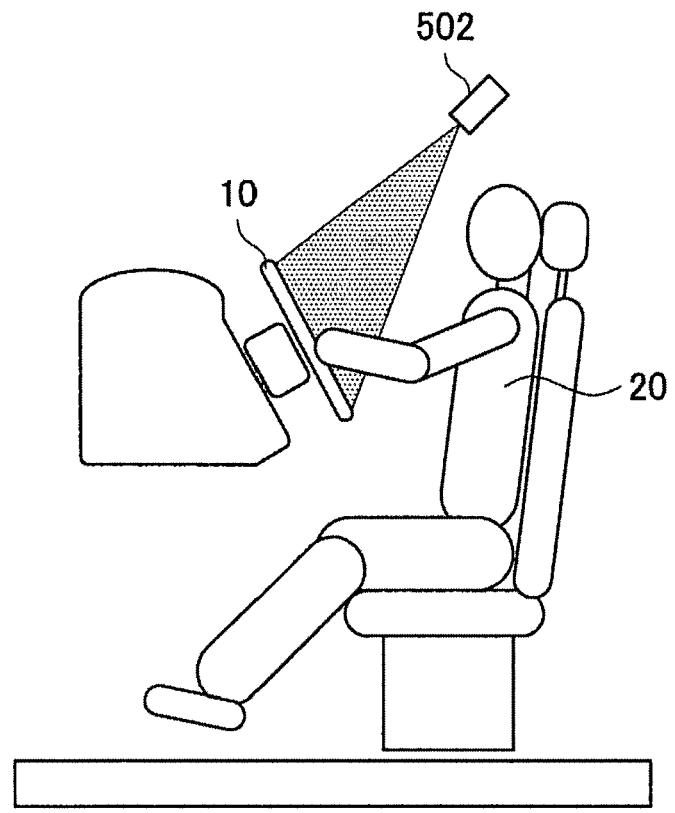
FIG. 4 is a schematic diagram illustrating a position where a projector is disposed in the case where a display device includes the projector.

FIG. 4 is a schematic diagram illustrating a position where a projector 502 is disposed in the case where the display device 500 includes the projector 502. FIG. 4 illustrates a state in which a driver 20 is viewed from a passenger seat side. As illustrated in FIG. 4, the projector 502 is mounted on the ceiling of the vehicle, for instance, applies light toward the steering wheel 10, and displays the pattern 12 on the steering wheel 10.

Figure 5:
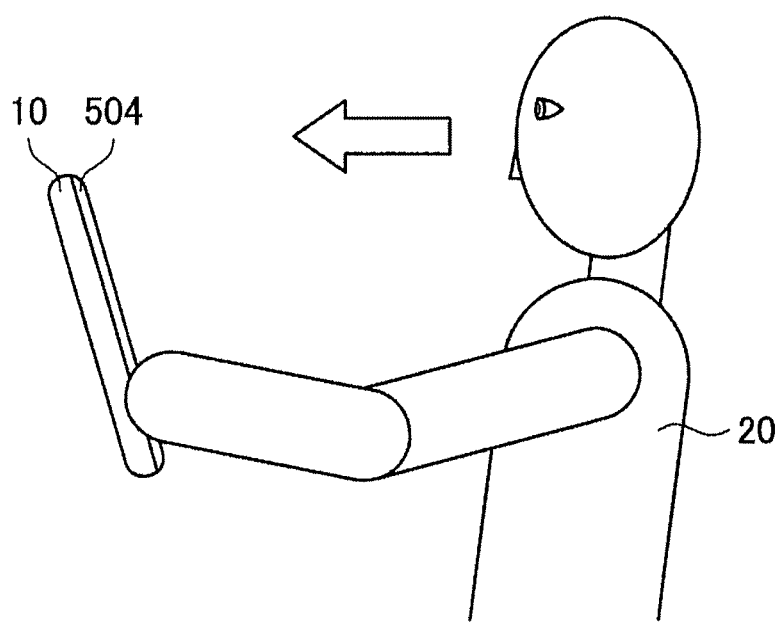
FIG. 5 is a schematic diagram illustrating an example in which a display device is provided on a steering wheel.

FIG. 5 is a schematic diagram illustrating an example in which the display device 500 is provided on the steering wheel 10. In this case, the display device 500 includes a liquid crystal display device 504 having a display surface that is curved along a shape of the steering wheel 10.

In response to operation of the steering wheel 10 by the driver 20, the pattern 12 is displayed so as to move in the same direction as the operation. In other words, the pattern 12 moves in the same direction as steering operation, along a circumferential direction of the steering wheel 10. Specifically, in the present example, a steering effort feel of the steering wheel 10 is changed by changing a speed at which the pattern 12 moves on the steering wheel 10 with respect to an actual steering speed of the steering wheel 10 by the operation by the driver 20.

If the speed at which the pattern 12 moves on the steering wheel 10 is higher than the actual steering speed of the steering wheel 10, the steering effort feel of the steering wheel 10 by the driver 20 feels light. Meanwhile, if the speed at which the pattern 12 moves on the steering wheel 10 is lower than the actual steering speed of the steering wheel 10, the steering effort feel of the steering wheel 10 by the driver 20 feels heavy.

Figure 6:
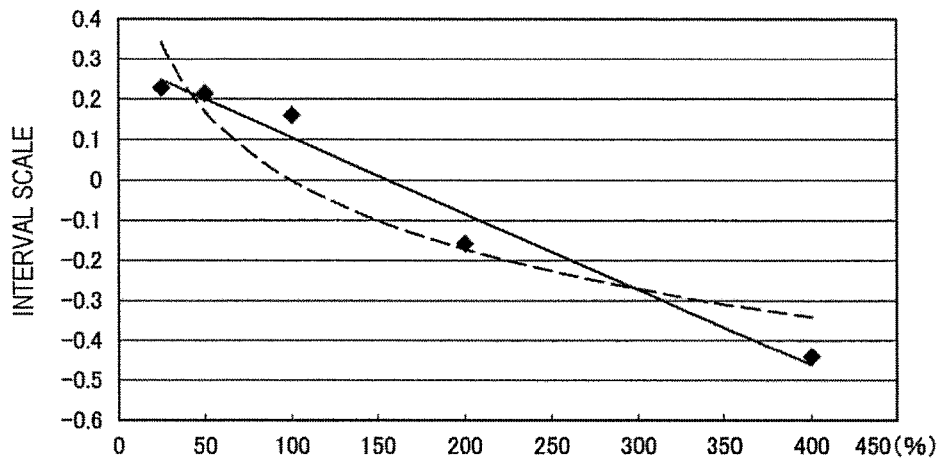
FIG. 6 is a characteristic diagram obtained by experiment, which illustrates how a steering feel of a driver changes in the case where a movement (amount of reaction) of a pattern on a steering wheel is changed with respect to an actual amount of operation of the steering wheel by the driver.

FIG. 6 is a characteristic diagram obtained by experiment, which illustrates how the steering feel of the driver 20 changes in the case where the movement (amount of reaction) of the pattern 12 on the steering wheel 10 is changed with respect to the actual amount of operation of the steering wheel 10 by the driver 20. In FIG. 6, the horizontal axis indicates a ratio of the movement (amount of reaction) of the pattern on the steering wheel 10 to the actual amount of operation of the steering wheel 10 by the driver 20, and the vertical axis indicates an interval scale value obtained by evaluation regarding steering by the driver 20.

In this experiment, by using a simulation device, video that changes to reflect the amount of operation of the steering wheel 10 was displayed on a screen in front of experiment participants. Specifically, the pattern 12 of black stripes at constant intervals was displayed on the steering wheel 10. The pattern 12 was displayed on the steering wheel 10 in such a manner that the pattern 12 moves in accordance with the amount of operation of the steering wheel 10. As the pattern 12, black lines with a width of about 0.3 cm placed at intervals of about 2.0 cm on a circumference along the steering wheel 10 were used.

The case where the ratio of the movement (amount of reaction) of the pattern 12 on the steering wheel 10 to the actual amount of operation of the steering wheel 10 is 100% on the horizontal axis in FIG. 6 indicates a state in which the movement of the pattern 12 matches the actual amount of operation of the steering wheel 10. In the case where the amount of operation and the amount of reaction thus have a one-to-one relationship, the steering wheel 10 and the pattern 12 are observed to move completely the same. The interval scale illustrated on the vertical axis in FIG. 6 is a value obtained in the following manner. A steering effort feel when the amount of operation and the amount of reaction have a one-to-one relationship was set at 0; in the case where the steering effort feel felt heavier than that, the experiment participants selected a larger value on the positive side for a heavier steering effort feel, and in the case where the steering effort feel felt lighter, the experiment participants selected a larger value on the negative side for a lighter steering effort feel.

As experimental conditions, five levels in total of 25%, 50%, 200%, 400%, and 100% as a reference were set on the basis of the ratio between the amount of operation and the amount of reaction. Specifically, in regard to cases where the ratio of the amount of reaction to the amount of operation is 25%, 50%, 200%, and 400%, when the steering wheel 10 is rotated 90 degrees, the pattern 12 rotates 22.5 degrees, 45 degrees, 180 degrees, and 360 degrees, respectively, in the same direction as the steering wheel 10. In addition, an indicator that makes an amplitude motion from side to side was presented in front of the experiment participants, a cursor that moves from side to side by a reciprocating motion of the steering wheel 10 was displayed, and a task of following the indicator with the cursor was set for the experiment participants. Three types were set as the amount of movement of the steering wheel 10, and were presented randomly. Note that the total amount of movement was unified. Two conditions were continuously presented as the movement of the indicator, and reaction force was evaluated by a paired comparison method by 15 experiment participants.

Consequently, as illustrated in FIG. 6, it was found that a reaction force feel decreases as the movement of the pattern 12 increases and the ratio of the movement (amount of reaction) of the pattern 12 to the actual amount of operation of the steering wheel 10 increases, in other words, steering feels lighter as the amount of reaction increases. It is apparent from FIG. 6 that the scale of a feeling regarding steering decreases as the movement (amount of reaction) of the pattern increases and the ratio of the amount of reaction to the actual amount of operation of the steering wheel 10 increases. In other words, it is apparent that the steering effort feel feels lighter as the amount of reaction increases, and the steering effort feel feels heavier as the amount of reaction decreases.

Consequently, the steering effort feel of the steering wheel 10 can be changed by changing the speed at which the pattern 12 moves on the steering wheel 10 with respect to the actual steering speed of the steering wheel 10 by the operation by the driver 20. Thus, the steering effort feel of the steering wheel 10 can be changed without need for a complicated structure, so that the driver 20 can perform steering operation optimally.

In particular, in the present example, the speed at which the pattern 12 moves with respect to the actual steering speed is changed in accordance with a vehicle speed V. Therefore, the control device 400 includes a vehicle speed determiner 402 that determines a magnitude of the vehicle speed V acquired from the vehicle sensor 100, a steering angular velocity calculator 404 that calculates a steering angular velocity when the driver 20 operates the steering wheel 10, from a detection value of the steering angle sensor 200, and a display controller 406 that controls movement of the pattern 12 on the basis of the magnitude of the vehicle speed V. Note that structural elements of the control device 400 illustrated in FIG. 1 can include a circuit (hardware), or a central processor such as a CPU and a program (software) for making it function.

The actual steering speed of the steering wheel 10 by the operation by the driver 20 can be found from a detection value of the steering angle sensor 200. The steering angular velocity calculator 404 finds the steering angular velocity of the steering wheel 10 for each predetermined cycle on the basis of the detection value of the steering angle by the steering angle sensor 200. For instance, in the case where the predetermined cycle is 500 [ms], the steering angular velocity is θ/0.5=2θ[rad/s] when the steering angle is changed by θ [rad] during 500 [ms].

The display controller 406 controls the speed at which the pattern 12 moves on the steering wheel 10 with respect to the steering angular velocity calculated by the steering angular velocity calculator 404, and controls the display device 500 to display the pattern 12 on the steering wheel 10. The speed at which the pattern 12 moves is controlled for each predetermined cycle described above by the display controller 406. In the case of making the movement of the pattern 12 faster with respect to the actual steering speed of the steering wheel 10, the display of the pattern 12 is controlled in such a manner that the angular velocity of the pattern 12 moving on the steering wheel 10 is faster than the steering angular velocity calculated by the steering angular velocity calculator 404. In addition, in the case of making the movement of the pattern 12 slower with respect to the actual steering speed of the steering wheel 10, the display of the pattern 12 is controlled in such a manner that the angular velocity of the pattern 12 moving on the steering wheel 10 is slower than the steering angular velocity calculated by the steering angular velocity calculator 404. In this manner, the movement of the pattern 12 can be made faster or slower with respect to the actual steering angular velocity of the steering wheel 10.

In addition, the control device 400 may control steering assist power by the power steering device 700 in accordance with the vehicle speed V. In this case, the control device 400 performs control in such a manner that the assist power is smaller when the vehicle speed V is high than when the vehicle speed V is low.

Figure 7:
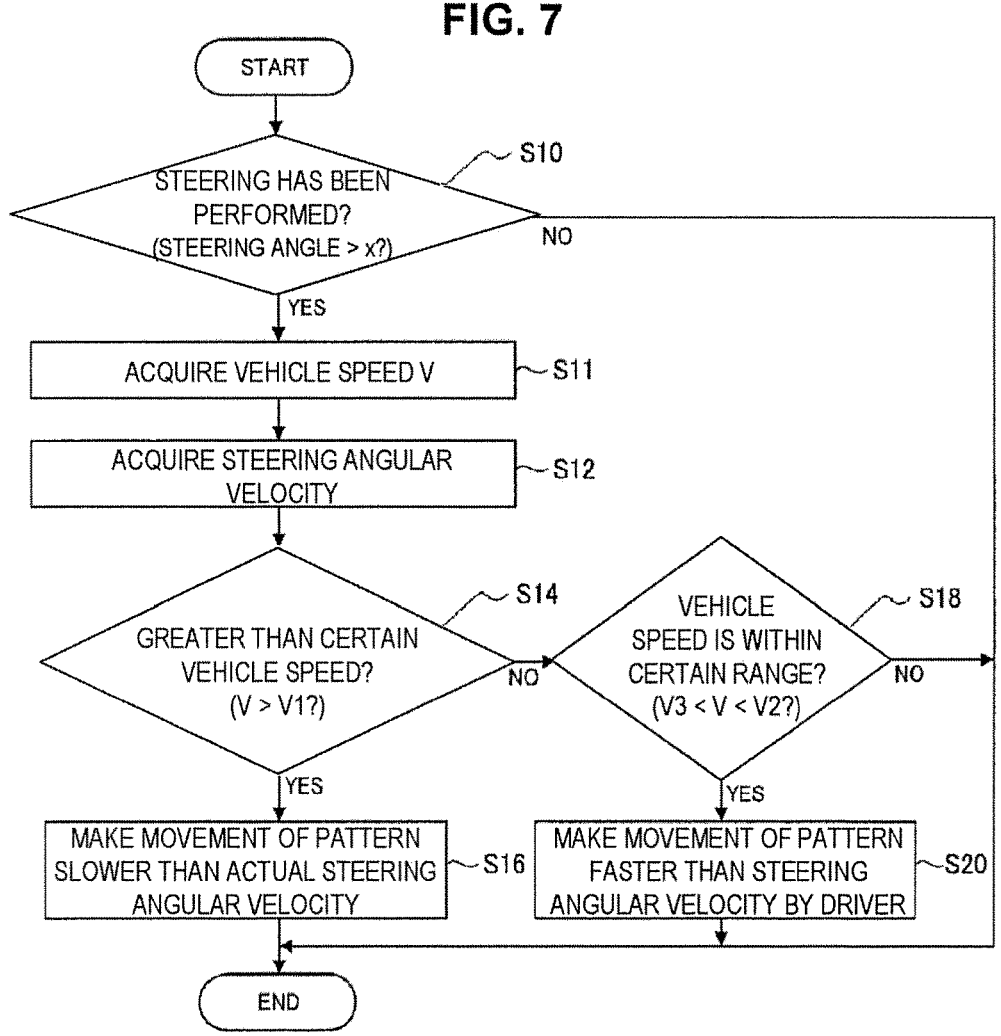
FIG. 7 is a flowchart illustrating processing performed in a drive assist system of a first example.

FIG. 7 is a flowchart illustrating processing performed in the drive assist system 1000 of the present example. The processing in FIG. 7 is performed for each predetermined cycle mainly in the control device 400. In the processing in FIG. 7, the movement of the pattern 12 is changed in accordance with the vehicle speed V. The pattern 12 may be displayed only when the amount of steering or the steering angular velocity of the steering wheel 10 is large.

First, in step S10, it is determined whether the driver 20 has operated the steering wheel 10 while driving the vehicle. Specifically, in the case where the steering angle of the steering wheel 10 obtained from the steering angle sensor 200 is greater than a predetermined threshold x, it is determined that the driver 20 has operated the steering wheel 10. In the case where it is determined that the driver 20 has operated the steering wheel 10, the processing goes to next step S11. Meanwhile, in the case where it is determined that the driver 20 has not operated the steering wheel 10, the processing ends (END).

In step S11, the vehicle speed V is acquired. In next step S12, a speed (steering angular velocity) when the driver 20 has operated the steering wheel 10 is acquired. The steering angular velocity is acquired from a result of calculation of the steering angular velocity by steering angular velocity calculator 404. In next step S14, it is determined whether the vehicle speed V is greater than a predetermined threshold V1, and in the case where the vehicle speed V is greater than the predetermined threshold V1, the processing goes to step S16. In step S16, the movement of the pattern 12 is controlled in such a manner that an angular velocity when the pattern 12 moves on the steering wheel 10 is slower than the actual steering angular velocity of the steering wheel 10 by the operation by the driver 20. The processing ends after step S16. Note that the determination in step S14 is performed by the vehicle speed determiner 402. A map defining an angular velocity of the pattern 12 in accordance with the vehicle speed V may be provided in advance, and the angular velocity of the pattern 12 may be decided on the basis of this map.

For instance, in the case where the vehicle speed V is high, such as when traveling on a freeway, it is desirable to stabilize steering by making the steering feel of the steering wheel 10 heavier. Therefore, in the case where the vehicle speed V detected by the vehicle sensor 100 is greater than the predetermined threshold V1, the display controller 406 of the control device 400 performs control to make the speed at which the pattern 12 moves on the steering wheel 10 slower with respect to the actual steering speed of the steering wheel 10. Thus, the steering feel that the driver 20 experiences when the driver 20 operates the steering wheel 10 becomes heavier, and steering can be stabilized.

Meanwhile, in the case where the vehicle speed V is equal to or less than the predetermined threshold V1 in step S14, the processing goes to step S18. In step S18, it is determined whether the vehicle speed V is within a certain range. Specifically, in step S18, it is determined whether the vehicle speed V is less than a predetermined threshold V2 and the vehicle speed V is greater than a predetermined threshold V3. In other words, in step S18, it is determined whether V3<V<V2 is satisfied. Note that V2<V1 is assumed to be satisfied.

In the case where V3<V<V2 is satisfied in step S18, the processing goes to step S20. In step S20, the movement of the pattern 12 is controlled in such a manner that an angular velocity when the pattern 12 moves on the steering wheel 10 is faster than the actual steering angular velocity of the steering wheel 10 by the operation by the driver 20. The processing ends after step S20.

In the case where the vehicle speed V is low, it is desirable to facilitate steering operation by making the steering feel of the steering wheel 10 lighter. For instance, in a situation like in the case of performing steering operation such as a cut of the wheel to park the vehicle in a parking lot or in the case of making a left-hand turn or a right-hand turn at an intersection, it is desirable to promote light steering operation by reducing the steering effort feel. Therefore, in step S18, it is determined whether the vehicle speed V is a speed corresponding to low-speed travel, such as a traveling state at the time of parking or a traveling state at the time of traveling through an intersection. For instance, values of the thresholds V2 and V3 are set to approximately 10 km/h and approximately 5 km/h, respectively. The vehicle speed determiner 402 of the control device 400 determines that the vehicle is in a driving state of low-speed travel in the case where the vehicle speed V satisfies the relationship of V3<V<V2. Then, in the case where it is determined that the vehicle is in a driving state of low-speed travel by the vehicle speed determiner 402, the display controller 406 of the control device 400 performs control to make the speed at which the pattern 12 moves on the steering wheel 10 faster with respect to the actual steering speed of the steering wheel 10. Thus, the steering feel that the driver 20 experiences when the driver 20 operates the steering wheel 10 becomes lighter, and steering operation can be performed lightly.

Meanwhile, in the case where the condition of V3<V<V2 is not satisfied in step S18, the processing ends without displaying the pattern 12 on the steering wheel 10. That is, in this case, the pattern 12 is not displayed on the steering wheel 10. Alternatively, in the case where the condition of V3<V<V2 is not satisfied in step S18, the pattern 12 may be displayed in such a manner that the pattern 12 moves at the same speed with respect to the actual steering speed of the steering wheel 10.

As described above, according to the first example, when the vehicle speed V is slow, the steering feel is caused to feel light by making the movement of the pattern 12 faster with respect to the actual steering speed of the steering wheel 10. In addition, when the vehicle speed V is fast, the steering feel is caused to feel heavy by making the movement of the pattern 12 slower with respect to the actual steering speed of the steering wheel 10. Thus, the steering feel can be changed optimally in accordance with the vehicle speed V.

2. Second Example

Next, a second example of the present invention is described. A configuration of the drive assist system 1000 of the second example is similar to that of the first example. In the second example, the speed at which the pattern 12 moves is changed on the basis of the amount of steering of the steering wheel 10.

As illustrated in FIG. 1, the control device 400 includes a steering angular velocity determiner 408 that determines a magnitude of an amount of steering on the basis of a steering angle acquired from the steering angle sensor 200. In the second example, the display controller 406 controls the movement of the pattern 12 on the basis of a magnitude of a steering angular velocity.

Figure 8:
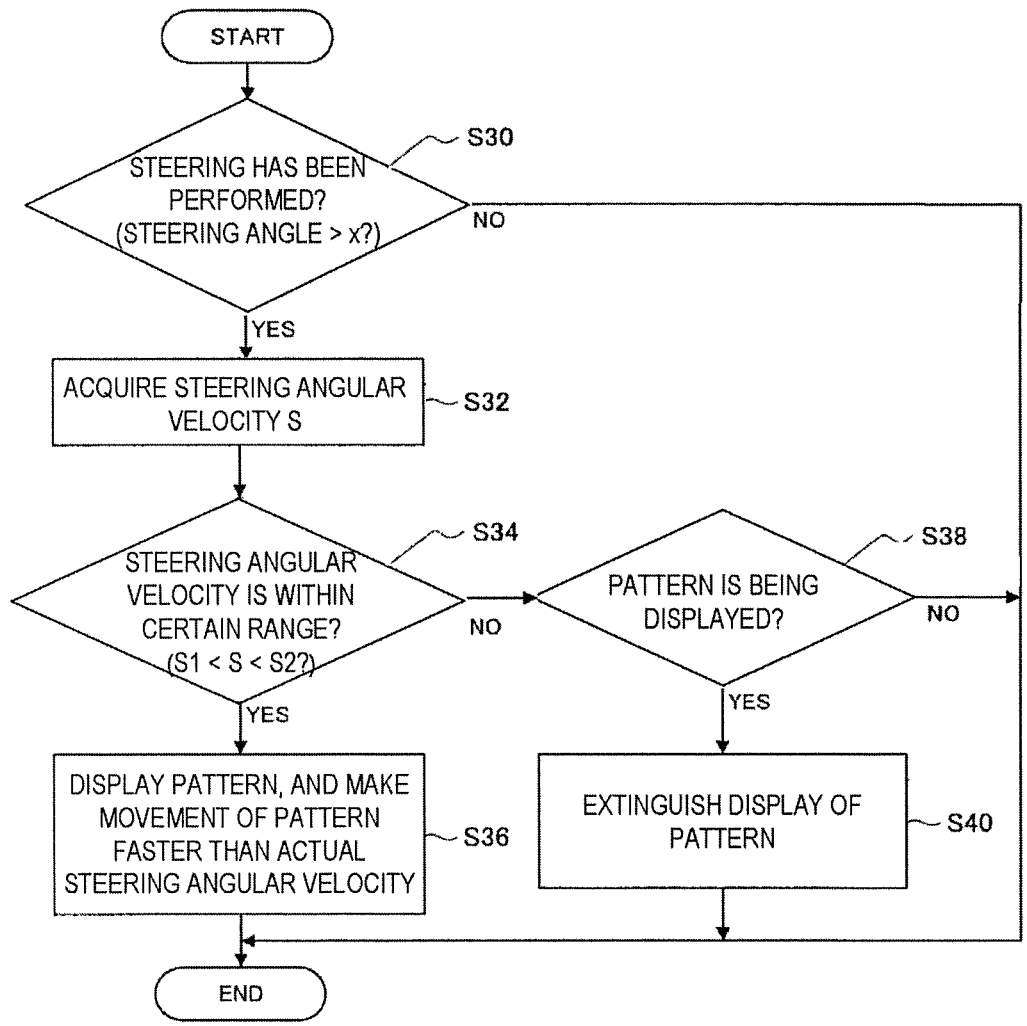
FIG. 8 is a flowchart illustrating processing performed in a drive assist system of a second example.

FIG. 8 is a flowchart illustrating processing performed in the drive assist system 1000 of the second example. The processing in FIG. 8 is performed for each predetermined cycle mainly in the control device 400. In the processing in FIG. 8, the movement of the pattern 12 is changed in accordance with a steering angular velocity S. Specifically, when the steering angular velocity S is fast, the movement of the pattern 12 is made faster to make the driver 20 feel a lighter steering feel of the steering wheel 10, thereby improving the steering feel. However, in the case where the steering angular velocity S is excessively large, the movement of the pattern 12 changes violently, which bothers the driver 20; hence, display of the pattern 12 is not performed. Thus, the pattern 12 may be displayed only in the case where the steering angular velocity is equal to or less than a certain level. In addition, a map of the speed of the pattern 12 corresponding to the steering angular velocity may be provided in advance.

First, in step S30, it is determined whether the driver 20 has operated the steering wheel 10 while driving the vehicle. Specifically, in the case where the steering angle of the steering wheel 10 obtained from the steering angle sensor 200 is greater than a predetermined threshold x, it is determined that the driver 20 has operated the steering wheel 10. In the case where it is determined that the driver 20 has operated the steering wheel 10, the processing goes to next step S32. Meanwhile, in the case where it is determined that the driver 20 has not operated the steering wheel 10, the processing ends (END).

In step S32, a speed (steering angular velocity S) when the driver 20 has operated the steering wheel 10 is acquired. In next step S34, it is determined whether the steering angular velocity S is within a certain range, in a range of predetermined time t [ms]. Specifically, in step S34, it is determined whether the steering angular velocity S is less than a predetermined threshold S2 and the steering angular velocity S is greater than a predetermined threshold S1. In other words, in step S34, it is determined whether S1<S<S2 is satisfied.

In the case where S1<S<S2 is satisfied in step S34, the processing goes to step S36. In step S36, the pattern 12 is displayed on the steering wheel 10, and the movement of the pattern 12 is controlled in such a manner that an angular velocity when the pattern 12 moves on the steering wheel 10 is faster than the actual steering angular velocity of the steering wheel 10 by the operation by the driver 20. The processing ends after step S36.

For instance, in a driving situation in which the steering wheel 10 is operated at a relatively fast steering speed, such as in the case of making a lane change or in the case of traveling on a winding road, it is desirable to facilitate steering operation by making the steering feel of the steering wheel 10 lighter. Therefore, in step S34, it is determined whether the driving situation corresponds to a driving situation in which the steering wheel 10 is operated at a relatively fast steering speed. The steering angular velocity determiner 408 of the control device 400 determines that the driving situation is a driving situation in which the steering wheel 10 is operated at a relatively fast steering speed in the case where the steering speed S satisfies the relationship of S1<S<S2. Then, in the case where it is determined that the driving situation is a driving situation in which the steering wheel 10 is operated at a relatively fast steering speed by the steering angular velocity determiner 408, the display controller 406 of the control device 400 performs control to make the speed at which the pattern 12 moves on the steering wheel 10 faster with respect to the actual steering speed of the steering wheel 10. Thus, the steering feel that the driver 20 experiences when the driver 20 operates the steering wheel 10 becomes lighter, and steering operation can be performed lightly.

Meanwhile, in the case where the condition of S1<S<S2 is not satisfied in step S34, the processing goes to step S38.

In step S38, it is determined whether the pattern 12 is being displayed on the steering wheel 10, and in the case where the pattern 12 is being displayed on the steering wheel 10, the processing goes to step S40. In step S40, processing of extinguishing display of the pattern 12 on the steering wheel 10 is performed. In the case where the pattern 12 is not being displayed on the steering wheel 10 in step S38, the processing ends.

Note that in the above description, the speed at which the pattern 12 moves is made faster with respect to the actual steering speed of the steering wheel 10 in the case where the steering angular velocity S is within a predetermined range; however, the speed at which the pattern 12 moves may be changed on the basis of an amount of steering. For instance, the speed at which the pattern 12 moves may be made faster with respect to the actual steering speed of the steering wheel 10 in the case where the amount of steering is within a predetermined range.

As described above, according to the second example, when the steering angular velocity S by the operation by the driver 20 is fast, the speed at which the pattern 12 moves on the steering wheel 10 is made faster with respect to the actual steering speed of the steering wheel 10. This can make the driver 20 feel a lighter steering feel of the steering wheel 10, thereby improving the steering feel.

3. Third Example

Next, a third example of the present invention is described. A configuration of the drive assist system 1000 of the third example is similar to that of the first example. In the third example, the speed at which the pattern 12 moves is changed on the basis of the vehicle speed V and the amount of steering of the steering wheel 10.

Figure 9:
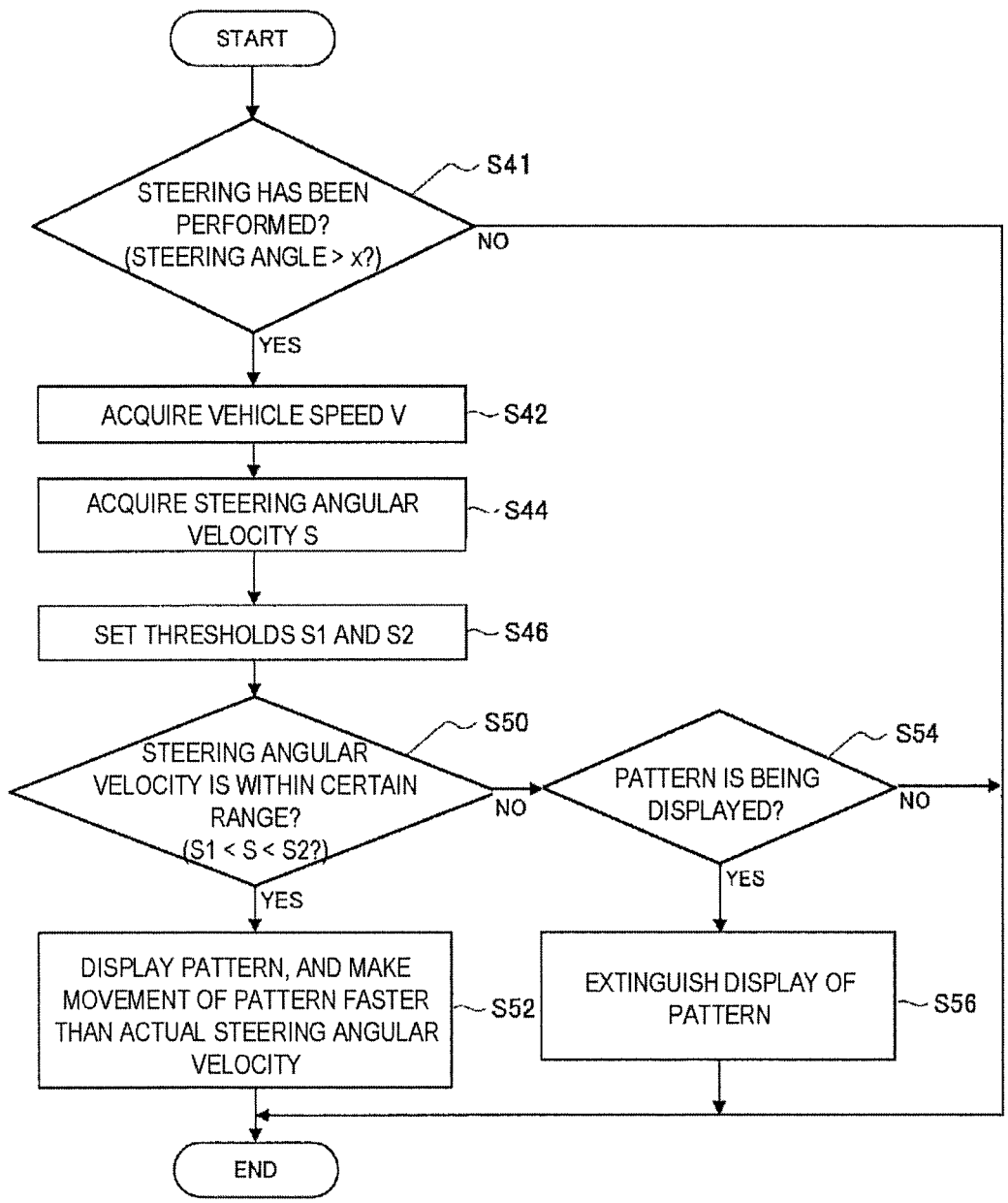
FIG. 9 is a flowchart illustrating processing performed in a drive assist system of a third example.

FIG. 9 is a flowchart illustrating processing performed in the drive assist system 1000 of the third example. The processing in FIG. 9 is performed for each predetermined cycle mainly in the control device 400. In the processing in FIG. 9, the movement of the pattern 12 is changed in accordance with the vehicle speed V and a steering angular velocity S.

First, in step S41, it is determined whether the driver 20 has operated the steering wheel 10 while driving the vehicle. Specifically, in the case where the steering angle of the steering wheel 10 obtained from the steering angle sensor 200 is greater than a predetermined threshold x, it is determined that the driver 20 has operated the steering wheel 10. In the case where it is determined that the driver 20 has operated the steering wheel 10, the processing goes to next step S42. Meanwhile, in the case where it is determined that the driver 20 has not operated the steering wheel 10, the processing ends (END).

In step S42, the vehicle speed V is acquired. In next step S44, a speed (steering angular velocity S) when the driver 20 has operated the steering wheel 10 is acquired. In next step S46, processing of setting thresholds S1 and S2 in determining the steering angular velocity S in next step S50 is performed on the basis of the vehicle speed V.

Figure 10:
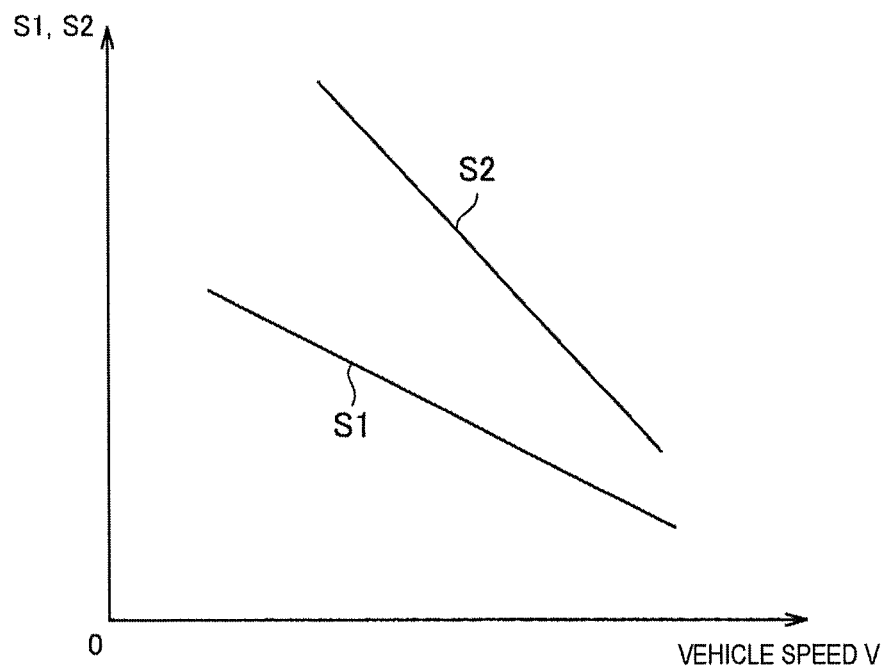
FIG. 10 is a schematic diagram illustrating a map for setting thresholds S1 and S2.

FIG. 10 is a schematic diagram illustrating a map for setting the thresholds S1 and S2 in step S46. In the third example, the thresholds S1 and S2 to be used in the determination in step S34 in the second example are set on the basis of the map illustrated in FIG. 10. As illustrated in FIG. 10, values of the thresholds S1 and S2 increase as the vehicle speed V decreases.

In the case of changing a direction of the vehicle, the amount of steering is larger when the vehicle speed V is low than when the vehicle speed V is high. Therefore, by making the values of the thresholds S1 and S2 larger as the vehicle speed V decreases, a driving situation in which the steering wheel 10 is operated at a relatively fast steering speed, which is described in the second example, can be determined more accurately. The setting of the thresholds S1 and S2 is performed by applying the vehicle speed V determined by the vehicle speed determiner 402 to the map illustrated in FIG. 10.

Processing of next step S50 and subsequent steps is performed in such a manner similar to that of the second example. In step S50, it is determined whether the steering angular velocity S is within a certain range, in a range of predetermined time t[ms]. Specifically, in step S50, it is determined whether the steering angular velocity S is less than a predetermined threshold S2 and the steering angular velocity S is greater than a predetermined threshold S1. In other words, in step S50, it is determined whether $S1<S<S2$ is satisfied.

In the case where $S1<S<S2$ is satisfied in step S50, the processing goes to step S52. In step S52, the pattern 12 is displayed on the steering wheel 10, and the movement of the pattern 12 is controlled in such a manner that an angular velocity when the pattern 12 moves on the steering wheel 10 is faster than the actual steering angular velocity of the steering wheel 10 by the operation by the driver 20. The processing ends after step S52.

As in the second example, for instance, in a driving situation in which the steering wheel 10 is operated at a relatively fast steering speed, such as in the case of making a lane change or in the case of traveling on a winding road, it is desirable to facilitate steering operation by making the steering feel of the steering wheel 10 lighter. Therefore, in step S50, it is determined whether the driving situation corresponds to a driving situation in which the steering wheel 10 is operated at a relatively fast steering speed. The steering angular velocity determiner 408 of the control device 400 determines that the driving situation is a driving situation in which the steering wheel 10 is operated at a relatively fast steering speed in the case where the steering speed S satisfies the relationship of $S1<S<S2$. Then, in the case where it is determined that the driving situation is a driving situation in which the steering wheel 10 is operated at a relatively fast steering speed by the steering angular velocity determiner 408, the display controller 406 of the control device 400 performs control to make the speed at which the pattern 12 moves on the steering wheel 10 faster with respect to the actual steering speed of the steering wheel 10. Thus, the steering feel that the driver 20 experiences when the driver 20 operates the steering wheel 10 becomes lighter, and steering operation can be performed lightly.

At this time, in the third example, in determining whether the driving situation is a driving situation in which the steering wheel 10 is operated at a relatively fast steering speed, the thresholds S1 and S2 for the determination are set in accordance with the vehicle speed V. Therefore, whether the driving situation is a driving situation in which the steering wheel 10 is operated at a relatively fast steering speed can be determined with higher precision.

Meanwhile, in the case where the condition of $S1<S<S2$ is not satisfied in step S50, the processing goes to step S54. In step S54, it is determined whether the pattern 12 is being displayed on the steering wheel 10, and in the case where the pattern 12 is being displayed on the steering wheel 10, the processing goes to step S56. In step S56, processing of extinguishing display of the pattern 12 on the steering wheel 10 is performed. In the case where the pattern 12 is not being displayed on the steering wheel 10 in step S54, the processing ends (END).

Figure 11:
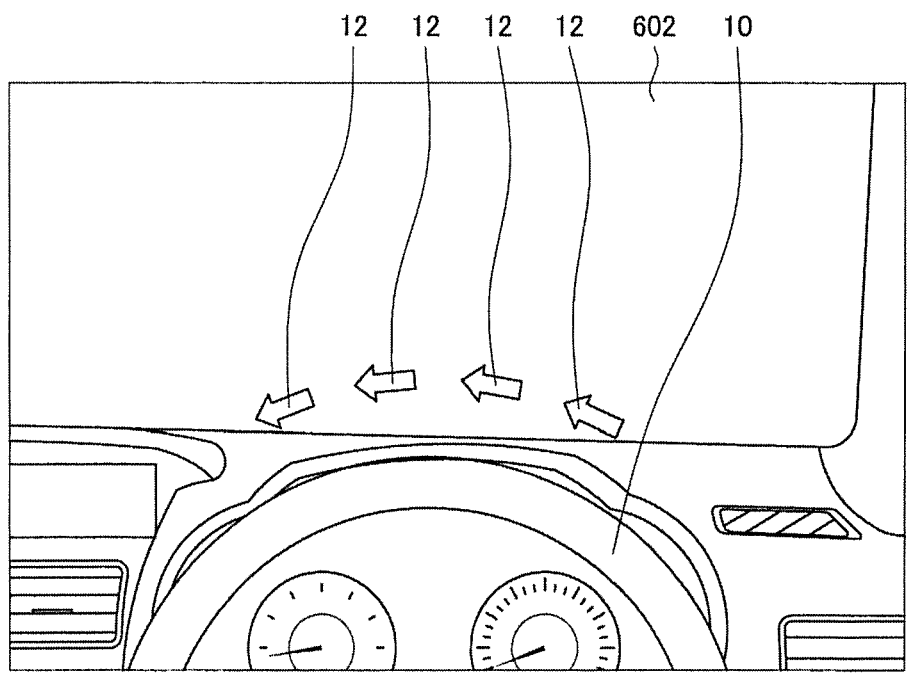
FIG. 11 is a schematic diagram illustrating an example in which a pattern is displayed on a front windshield by a HUD device.

Note that the above examples describe examples in which the pattern 12 is displayed on the steering wheel 10, but the pattern 12 may be displayed on a place other than the steering wheel 10. For instance, the pattern 12 may be displayed on a dash panel or a front windshield. FIG. 11 is a schematic diagram illustrating an example in which the pattern 12 is displayed on a front windshield 602 by the HUD device 600. The HUD device 600 is controlled by the display controller 406 to change the speed at which the pattern 12 moves on the front windshield 602 with respect to the actual steering speed of the steering wheel 10 by the operation by the driver 20, thereby changing the steering effort feel of the steering wheel 10.

Specifically, the pattern 12 illustrated in FIG. 11 is placed concentrically with the steering wheel 10, and an angular velocity of the pattern 12 around a rotation center axis of the steering wheel 10 is controlled with respect to the actual steering angular velocity of the steering wheel 10. Thus, the steering effort feel of the driver 20 can be optimized by controlling the movement of the pattern 12 on the front windshield 602, as in the case of displaying the pattern 12 on the steering wheel 10.

Figure 12:
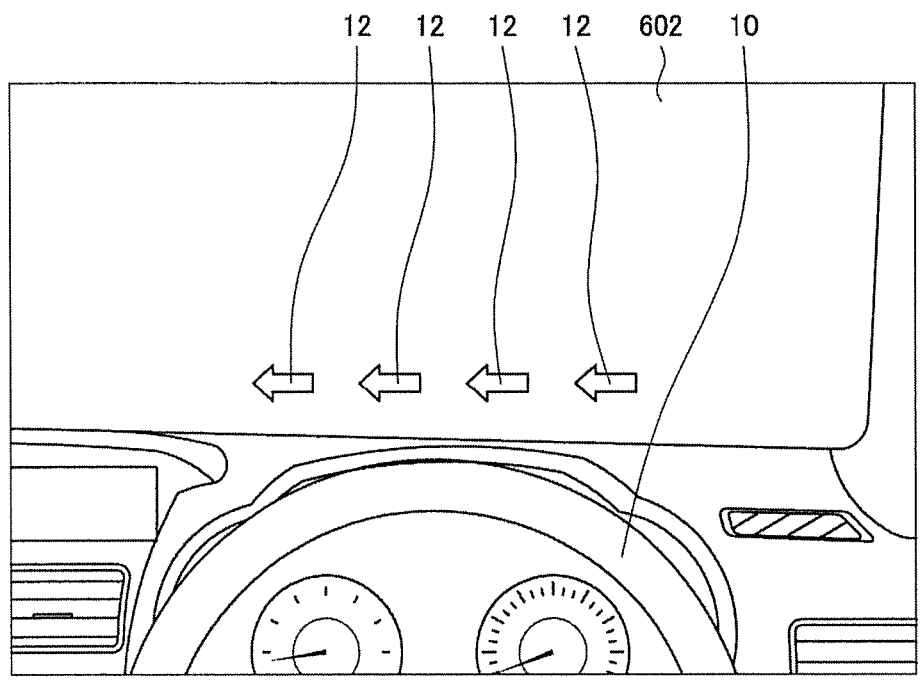
FIG. 12 is a schematic diagram illustrating an example in which a pattern is displayed on a front windshield by a HUD device.

Alternatively, as illustrated in FIG. 12, the pattern 12 that moves in a horizontal direction may be displayed on the front windshield 602 by the HUD device 600. In this case, a reference speed of the pattern 12 corresponding to the steering angular velocity of the steering wheel 10 is set, and the speed at which the pattern 12 moves on the front windshield 602 with respect to the actual steering angular velocity of the steering wheel 10 by the operation by the driver 20 is changed with respect to the reference speed. Thus, the steering effort feel can be adjusted as in the case of moving the pattern 12 in the circumferential direction.

As described above, according to the third example, the speed at which the pattern 12 moves on the steering wheel 10 is made faster with respect to the actual steering speed of the steering wheel 10, on the basis of both the vehicle speed V and the steering angular velocity S. This can make the driver 20 feel a lighter steering feel of the steering wheel 10, thereby improving the steering feel.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A drive assist device comprising:
   a determiner configured to determine a parameter related to a current driving state of a vehicle, the parameter comprising a vehicle speed of the vehicle; and
   a display controller configured to:
      provide for display a display object that moves in response to a movement of a steering wheel of the vehicle;
      when the vehicle speed is greater than a threshold speed, control the movement of the display object to be slower than the movement of the steering wheel; and
      when the vehicle speed is equal to or less than the threshold speed, control the movement of the display object to be faster than the movement of the steering wheel.

2. The drive assist device according to claim 1, wherein the display object is displayed on the steering wheel and moves along a circumference of the steering wheel.

3. The drive assist device according to claim 1, further comprising
   a steering angular velocity calculator configured to calculate a steering angular velocity of the steering wheel,
   wherein the display controller controls an angular velocity of the display object with respect to the steering angular velocity of the steering wheel based on the parameter related to the current driving state of the vehicle.

4. The drive assist device according to claim 1, wherein the display object is displayed on a dash panel or a windshield in front of a driver of the vehicle.

5. A drive assist device comprising:
   a determiner configured to determine a parameter related to a current driving state of a vehicle, the parameter comprising a steering amount of the steering wheel of the vehicle; and
   a display controller configured to:
      provide for display a display object that moves in response to a movement of a steering wheel of the vehicle; and
      when the steering amount of the steering wheel is within a steering range, the display controller controls the movement of the display object to be faster than the movement of the steering wheel.

6. The drive assist device according to claim 5, wherein when the steering amount of the steering wheel is outside the steering range, the display controller refrains from displaying the display object.

7. The drive assist device according to claim 5, wherein the steering range is set in accordance with the vehicle speed of the vehicle.

8. The drive assist device according to claim 7, wherein the steering range comprises an upper limit value and a lower limit value, and
   wherein the upper limit value and the lower limit value increase as the vehicle speed decreases.

9. The drive assist device according to claim 8, wherein a difference between the upper limit value and the lower limit value increases as the vehicle speed decreases.

10. A drive assist method comprising:
    determining a parameter related to a current driving state of a vehicle, the parameter comprising a vehicle speed of the vehicle;
    providing for display, on a display, a display object that moves in response to a movement of a steering wheel of the vehicle; and
    when the vehicle speed is within a speed range, controlling the movement of the display object to be faster than the movement of the steering wheel.

11. The drive assist method according to claim 10, wherein the display object is displayed on the steering wheel and moves along a circumference of the steering wheel.

12. The drive assist method according to claim 10, wherein the display object is displayed on a dash panel or a windshield of the vehicle.

* * * * *